(12) United States Patent
Wright et al.

(10) Patent No.: US 8,056,491 B2
(45) Date of Patent: Nov. 15, 2011

(54) BERTHING SYSTEM AND STRUCTURE FOR USE THEREIN

(75) Inventors: Peter McLean Wright, Ayrshire (GB); James Dickson, Stirlingshire (GB)

(73) Assignee: Easyberth Limited, Denny, Stirlingshire (CH)

( * ) Notice: Subject to any disclaimer, the term of this patent is extended or adjusted under 35 U.S.C. 154(b) by 348 days.

(21) Appl. No.: 12/227,511

(22) PCT Filed: May 23, 2007

(86) PCT No.: PCT/GB2007/050290
§ 371 (c)(1), (2), (4) Date: Feb. 9, 2009

(87) PCT Pub. No.: WO2007/138347
PCT Pub. Date: Dec. 6, 2007

(65) Prior Publication Data
US 2009/0205553 A1    Aug. 20, 2009

(30) Foreign Application Priority Data
May 27, 2006    (GB) .................................. 0610618.1

(51) Int. Cl.
*E02B 3/24* (2006.01)

(52) U.S. Cl. .................... 114/230.15; 114/219

(58) Field of Classification Search .................. 114/219, 114/230.15, 230.19
See application file for complete search history.

(56) References Cited

U.S. PATENT DOCUMENTS

| | | | | |
|---|---|---|---|---|
| 3,783,816 | A * | 1/1974 | de Chassy et al. | 114/230.15 |
| 4,331,097 | A * | 5/1982 | Belinsky | 114/230.15 |
| 4,883,013 | A * | 11/1989 | Lin | 114/219 |
| 4,979,453 | A | 12/1990 | Sloan | |
| 5,911,189 | A * | 6/1999 | Ryan | 114/230.15 |
| 6,422,169 | B1 * | 7/2002 | Schwantes | 114/230.19 |
| 6,575,110 | B1 * | 6/2003 | Nelson | 114/219 |
| D587,835 | S * | 3/2009 | Hanson | D26/85 |
| 2006/0130727 | A1 * | 6/2006 | Eischeid | 114/219 |

FOREIGN PATENT DOCUMENTS

| | | |
|---|---|---|
| DE | 20 2005 007784 | 9/2005 |
| FR | 1 467 842 | 4/1967 |
| NL | 6508140 | 8/1965 |

\* cited by examiner

*Primary Examiner* — Stephen Avila
(74) *Attorney, Agent, or Firm* — Drinker Biddle & Reath LLP

(57) ABSTRACT

A separation and guidance structure comprises an arm having an inner end with a crosspiece secured in use to a pontoon or the like, and an outer end provided with fenders extending above and beyond the end of the arm. Flotation is provided to support the outer end of the arm, and may be in the form of a flotation member or be provided by the fenders. In use a number of such structures are secured in parallel to a pontoon or dock to form a berthing system.

20 Claims, 8 Drawing Sheets

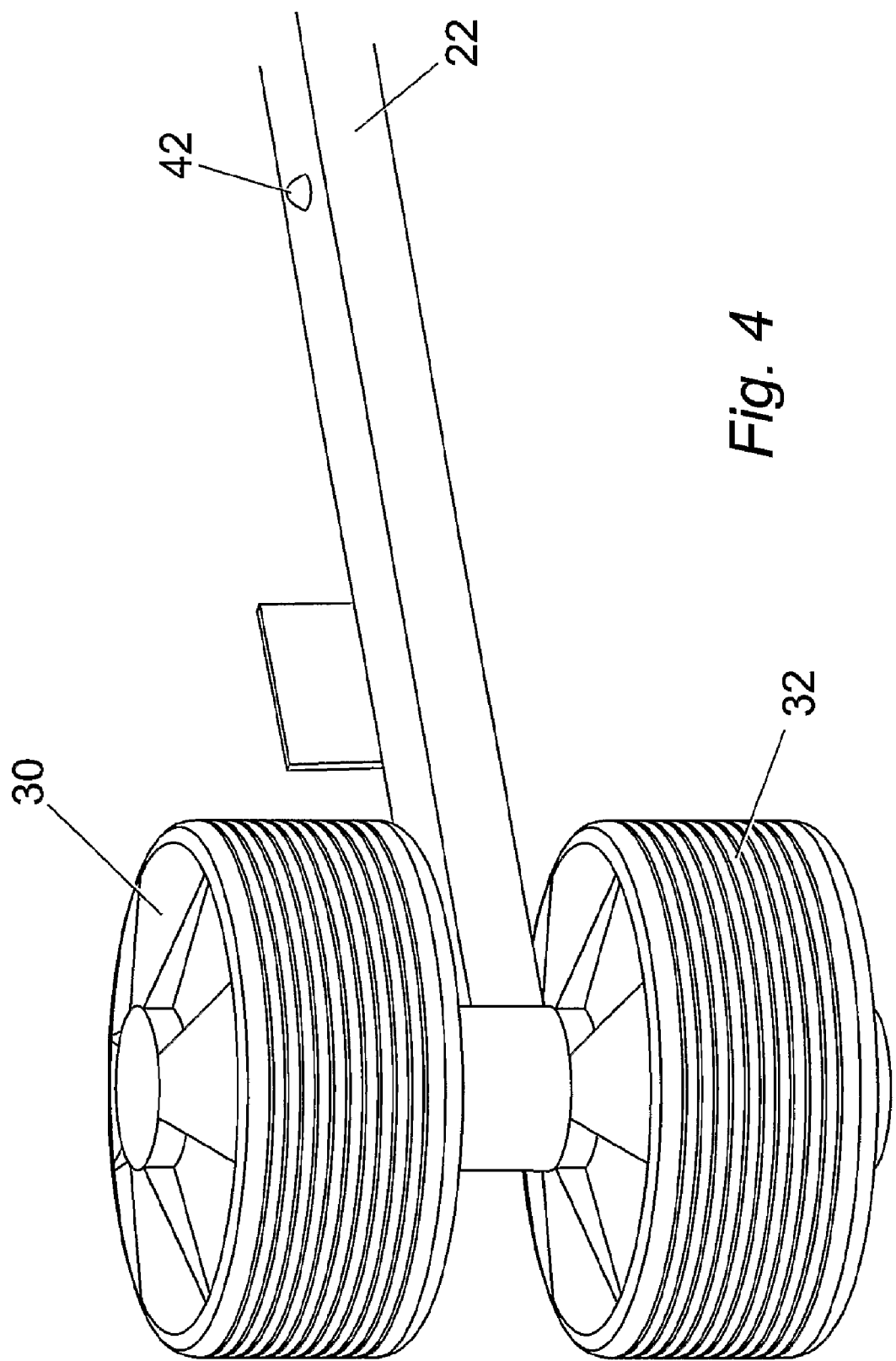

US 8,056,491 B2

BERTHING SYSTEM AND STRUCTURE FOR USE THEREIN

FIELD OF THE INVENTION

This invention relates to berthing systems and is particularly, but not exclusively, applicable to the berthing of small craft such as sail and power yachts in marinas and the like.

BACKGROUND

In some sailing areas, such as the United Kingdom, a marina has floating pontoons from which extend floating fingers. Generally the fingers are spaced apart such that two craft can occupy the space between, each craft being adjacent and attached to a finger. Generally the fingers include decking allowing users to walk on the finger and access the attached craft, flotation units provided beneath the decking, and mooring points allowing the securing of ropes to attach the adjacent craft. To enter the berth, the user has to approach parallel to the pontoon and then make a right-angle turn into the berth. This manoeuvre can present some difficulty, especially where there is a strong wind or tidal current across the berth, or if the user lacks experience, and it is quite common for a craft entering or leaving a berth to make contact with the neighbouring vessel or with the corner of the finger. Such contact is frequently sufficiently heavy to case damage. Also, in an attempt to minimise such occurrences marina operators may increase the spacing between fingers; this makes maneuvering simpler but is wasteful of valuable mooring space.

In other sailing waters, such as the Mediterranean, small craft commonly berth bows-to or stern-to a floating pontoon or a fixed dock. In this case, the craft must approach at right angles to the pontoon or dock into a clear space between vessels already berthed. The leading end (bows or stern) must be made fast to the pontoon or dock, and the opposite end is secured to permanent mooring ropes with pick-up buoys, or by dropping an anchor during the approach. Here again, the manoeuvre can be difficult in cross-wind or cross-tide conditions, especially if made into a space which is just sufficiently wide, and damaging collisions can occur.

It will be appreciated that floating pontoons are generally used wherever there is a significant tidal range, while fixed docks are commonly used where tidal range is small, e.g. the Mediterranean or the Baltic. For simplicity, the term "pontoon" will be used herein to include both.

SUMMARY OF THE INVENTION

The present invention seeks to improve upon these practices, and to provide a berthing system which is safer in use and which potentially can increase the berthing density.

Accordingly, the invention provides a separation and guidance structure for use in a berthing system, the structure comprising a link arm, attachment means for connection to a pontoon at a first end of the link arm, a flotation device toward a second end of the link arm, and at least one first fender provided at the second end of the link arm, at least a portion of the first fender extending above the link arm and beyond the end of the link arm so as to serve as a guidance means for a boat approaching the berthing system.

From another aspect, the invention provides a berthing system comprising a pontoon or dock and a plurality of such separation and guidance structures extending from the pontoon or dock.

Preferred features and advantages of the invention will be apparent from the claims and from the following description.

BRIEF DESCRIPTION OF THE DRAWINGS

Embodiments of the invention will now be described, by way of example, with reference to the drawings, in which:

FIG. 4 is a partial perspective view illustrating a modification of FIG. 3;

DESCRIPTION OF THE PREFERRED EMBODIMENTS

Figure 1:
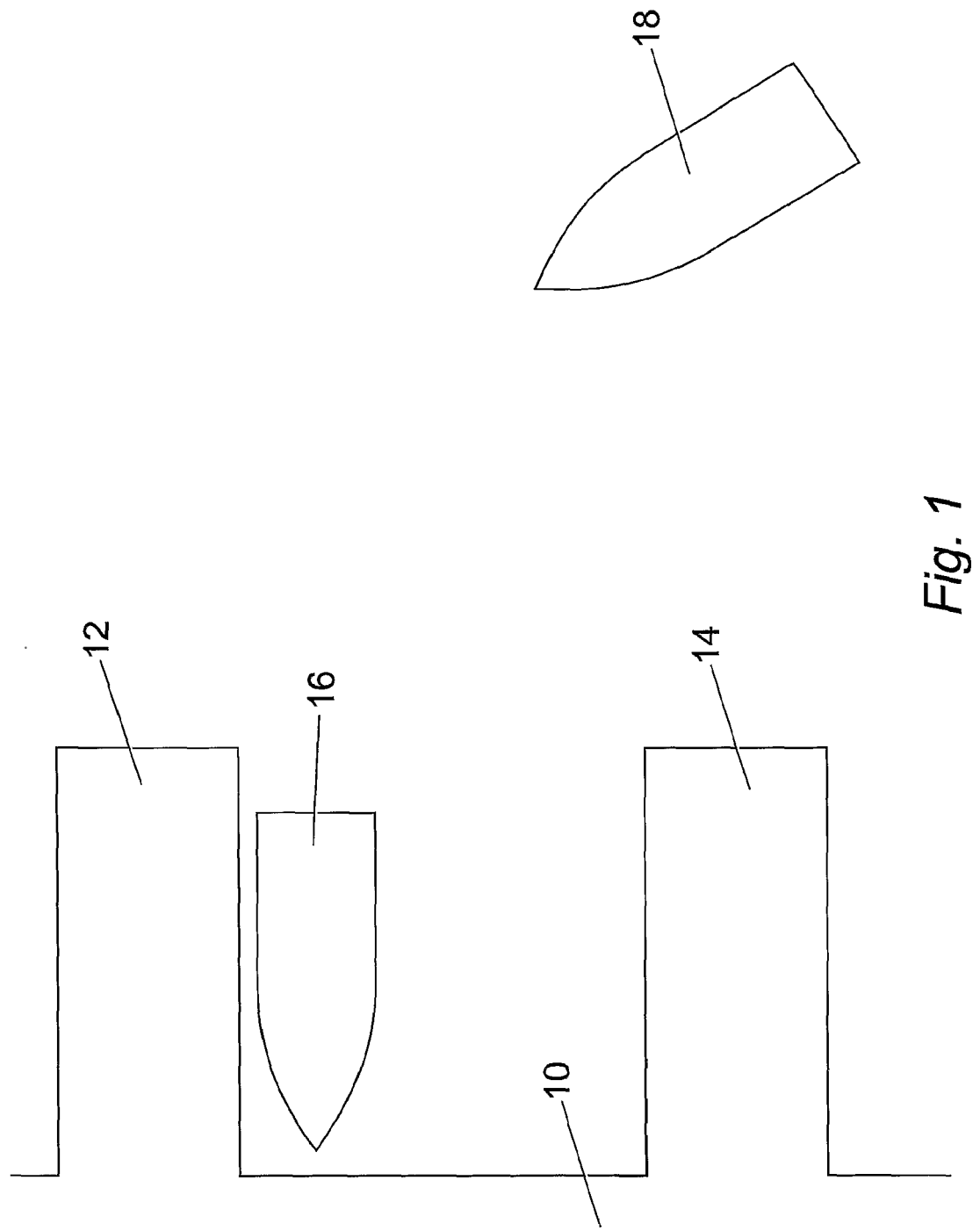
FIG. 1 is a schematic plan view of a prior art berthing system.

FIG. 1 shows a conventional berthing arrangement, with a pontoon 10 and fingers 12 and 14. A vessel 16 is berthed at the finger 12, and another vessel 18 is approaching the finger 14.

Figure 2:
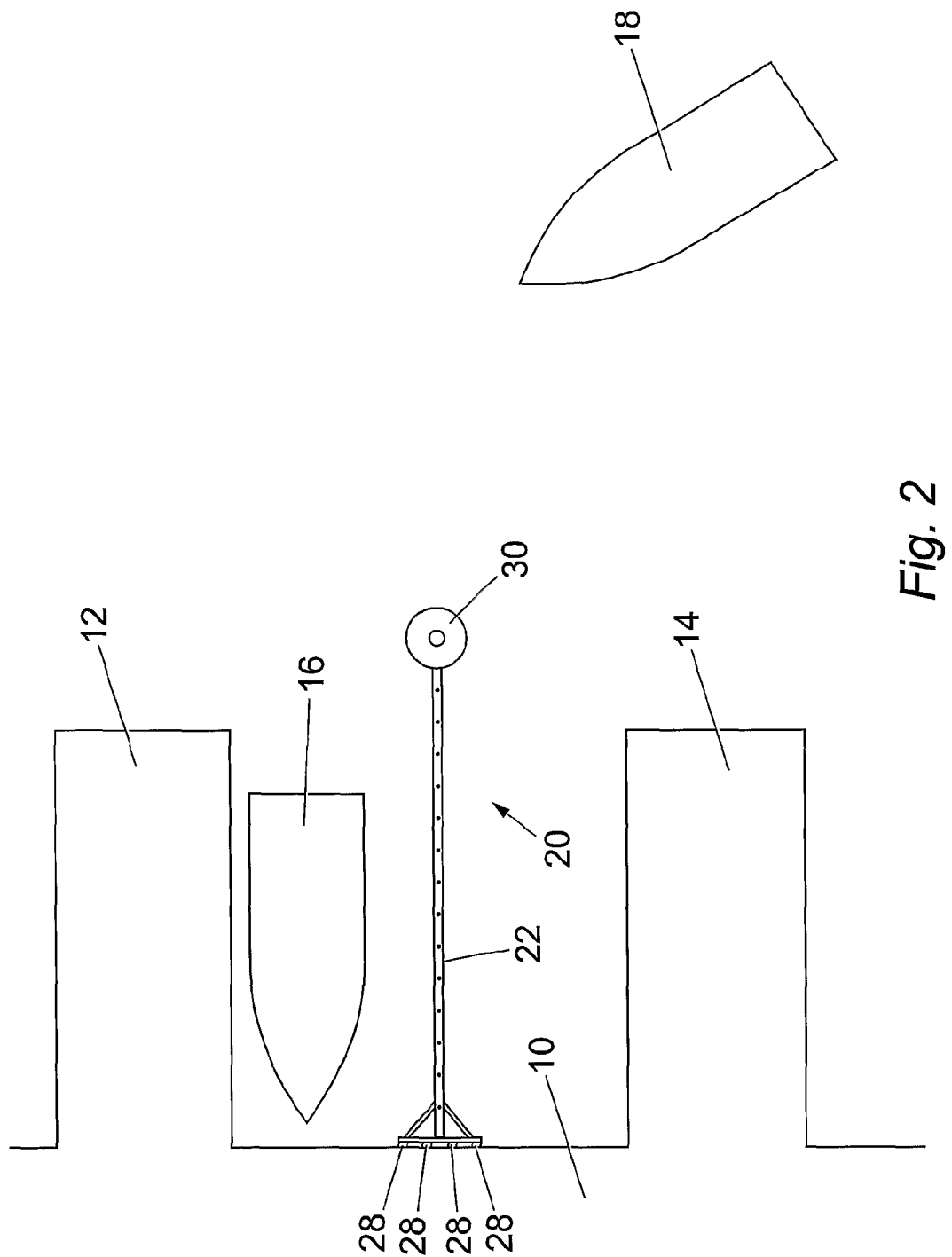
FIG. 2 is a similar view showing a first embodiment of the present invention.
Figure 3:
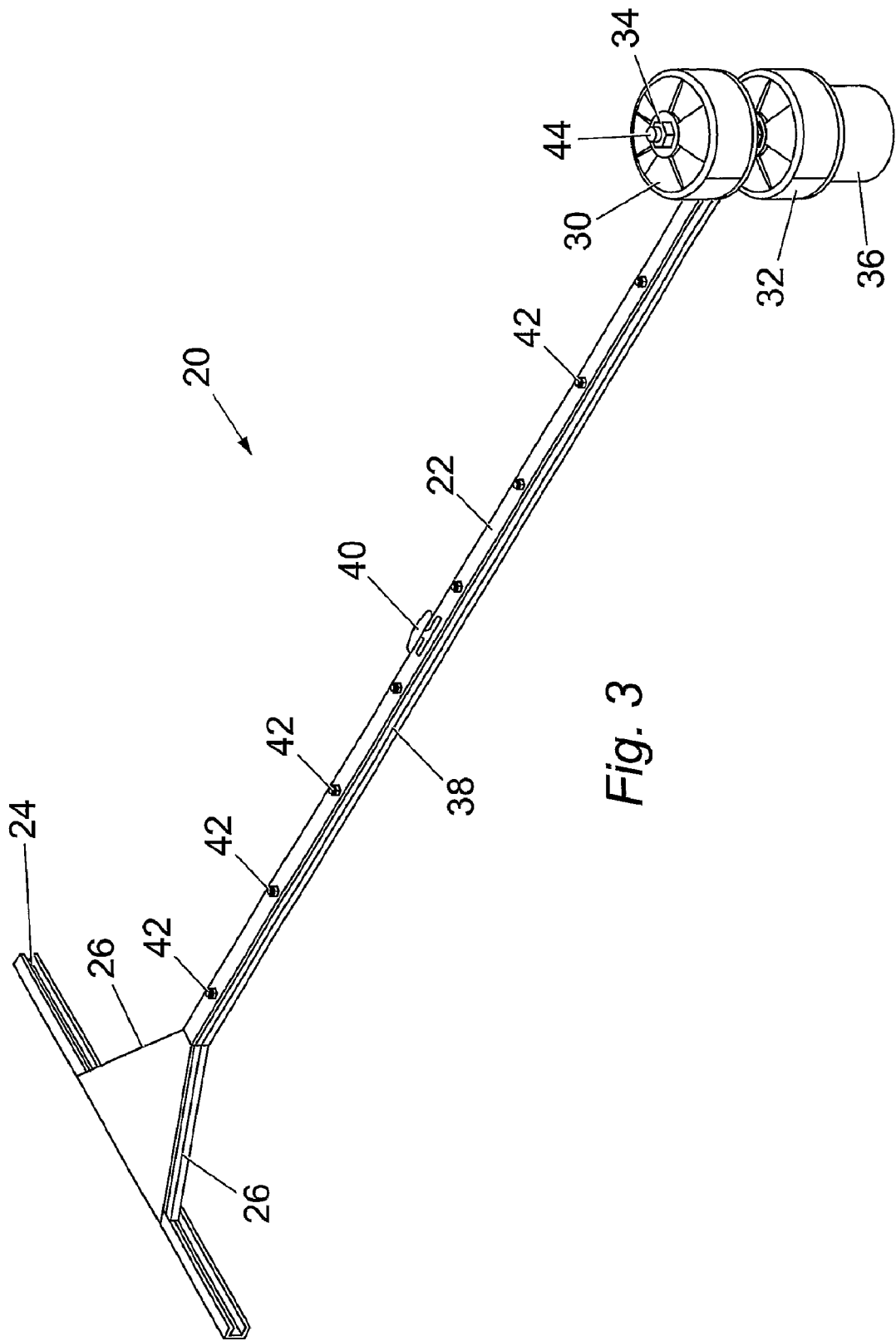
FIG. 3 is a perspective view to an enlarged scale of a separation and guidance structure used in FIG. 2.

Referring to FIGS. 2 and 3, in a first embodiment of the invention a separating and guidance structure generally designated at 20 is positioned between the fingers 12, 14. The structure 20 comprises a rigid arm 22 secured at its inboard end to a crosspiece 24 serving as a connection member, and braced by bracing members or struts 26. The crosspiece 24 and struts 26 together serve as a mounting bracket for connection to the pontoon and adapted to provide resistance to lateral forces.

Figure 3A:
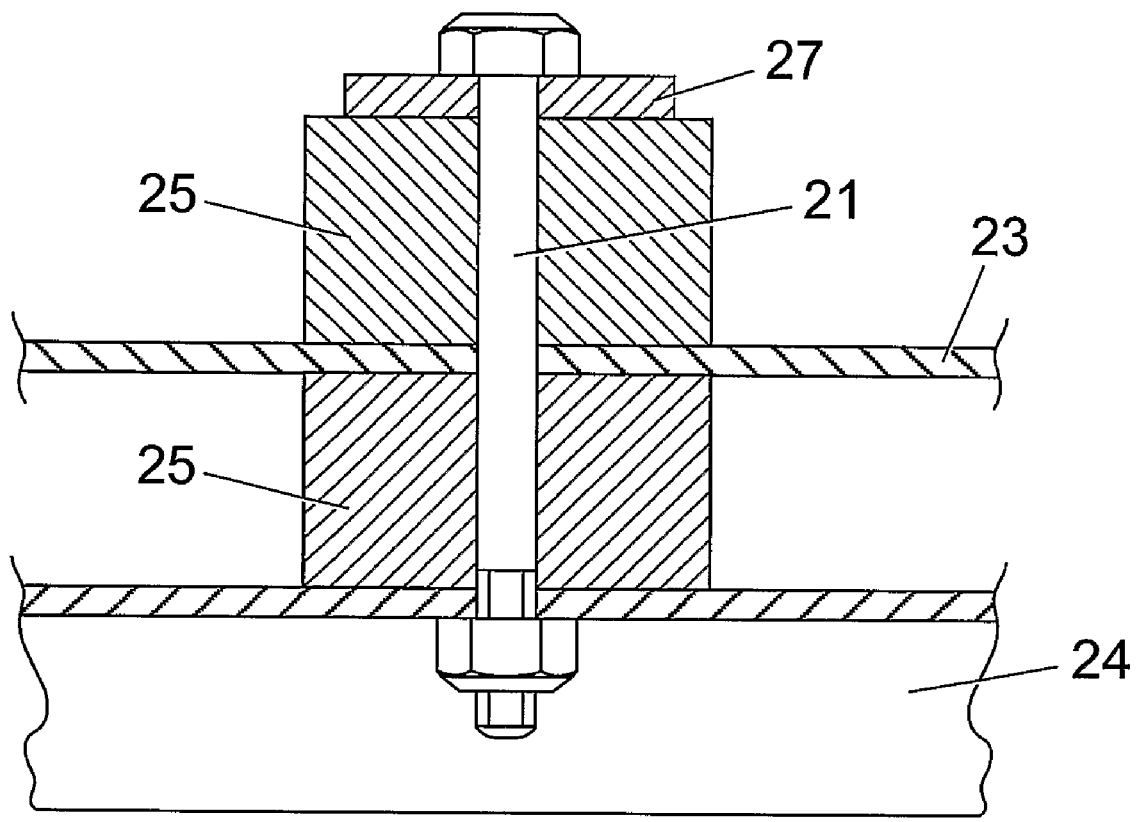
FIG. 3A shows part of the embodiment of FIGS. 2 and 3 in more detail.

The crosspiece 24 is secured to the pontoon 10, for example by bolting, preferably with rubber buffers shown diagrammatically at 28 (FIG. 2) interposed between the crosspiece 24 and the pontoon 10 to act as resilient dampers. FIG. 3A shows one form of buffer arrangement in more detail. The crosspiece 24 is secured to the pontoon 10 by bolts such as 21 passing through aligned apertures in the crosspiece 24 and a structural member 23 of the pontoon, and in resilient blocks 25 disposed on either side of the member 23. A washer or pressure plate 27 may be disposed between the head of the bolt 21 and the adjacent resilient block 25. Thus, resilient damping will be applied to axial movement of the structure 20 in either direction.

In exposed locations it may be preferred to provide a hinge arrangement between the arm and the pontoon, particularly a horizontal axis hinge allowing the arm to rotate in a vertical plane to accommodate wave motion. This may be useful in situations where the berthing system is only used in fair weather, but must itself survive severe weather.

Reverting to FIG. 3, the outboard end of the arm 22 carries a pair of cylindrical fenders 30 and 32 disposed one above and one below the arm 22. The fenders 30 and 32 are mounted on a vertical shaft 34 which is mounted for rotation on the arm 22. The lower end of the shaft 34 also carries a flotation member 36. The fenders 30 and 32 are dimensioned and positioned to extend beyond the sides and end of the arm 22.

Thus, the structure 20 is supported between the two fingers 12 and 14 and acts to separate craft berthed at the fingers. The rotatable fenders 30 and 32 assist craft entering and leaving the berths by providing a non-damaging surface against which the craft can bear; that is, the fenders can be used as a turning dolphin. The structure 20 also allows a berthed craft to be secured by warps on both sides, not just to the finger.

The arm 22 has a resilient fendering strip 38 on each side, and a central cleat 40. Guidance lights 42 are mounted along the upper surface of the arm 22, and an identification light 44 is mounted at the top of the shaft 34. The lights 42 and 44 may suitably be LEDs, and can be powered by shore power or, conveniently, by an independent solar panel (not shown). By providing the guidance lights 42 at regular intervals along the arm 22, the user is assisted in judging speed and location within the berth.

If the fenders 30 and 32 have sufficient flotation, the flotation member 36 may be dispensed with, the lower fender 32 acting also as flotation member. This arrangement is shown in FIG. 4. The fenders 30, 32 may suitably be hollow plastic moulding, foam-filled plastic mouldings, or solid foam, in each case with suitable metalwork secured or cast in the centre.

Instead of the shaft 34 being rotatable on the arm 22, it may be rigid with the arm 22, for example being fastened to the arm with a screw clamp, with the fenders being rotatable on the shaft.

Figure 5:
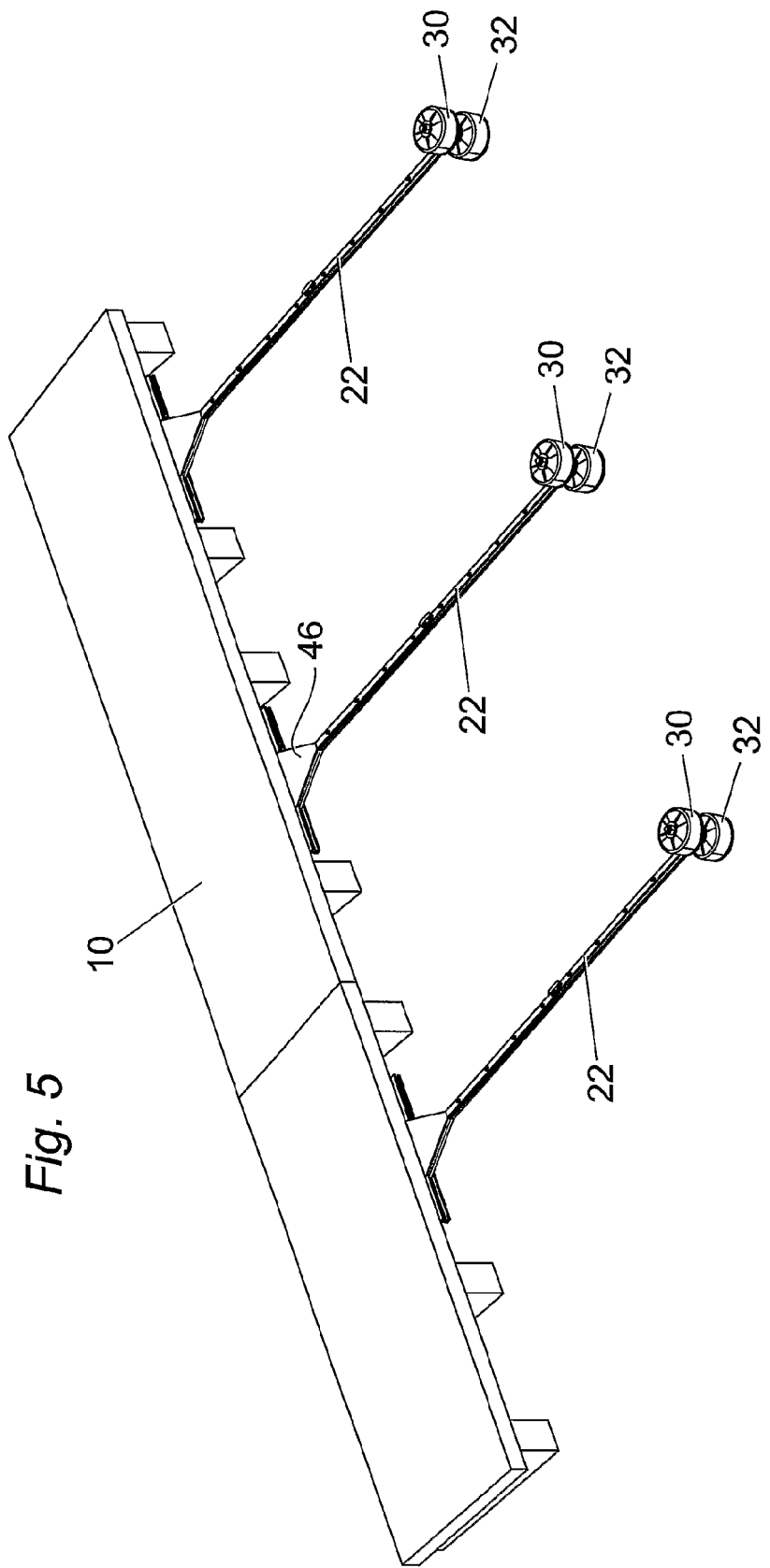
FIG. 5 shows a row of berths without fingers.

In situations where stern-to or bows-to berthing is acceptable, a series of structures 22 may be used without intervening fingers, as illustrated in FIG. 5. This can increase berthing density by 18% or more compared with finger berthing. FIG. 5 also shows the bracing struts 26 covered by a deck 46 which can provide storage or trolley parking.

Figure 6:
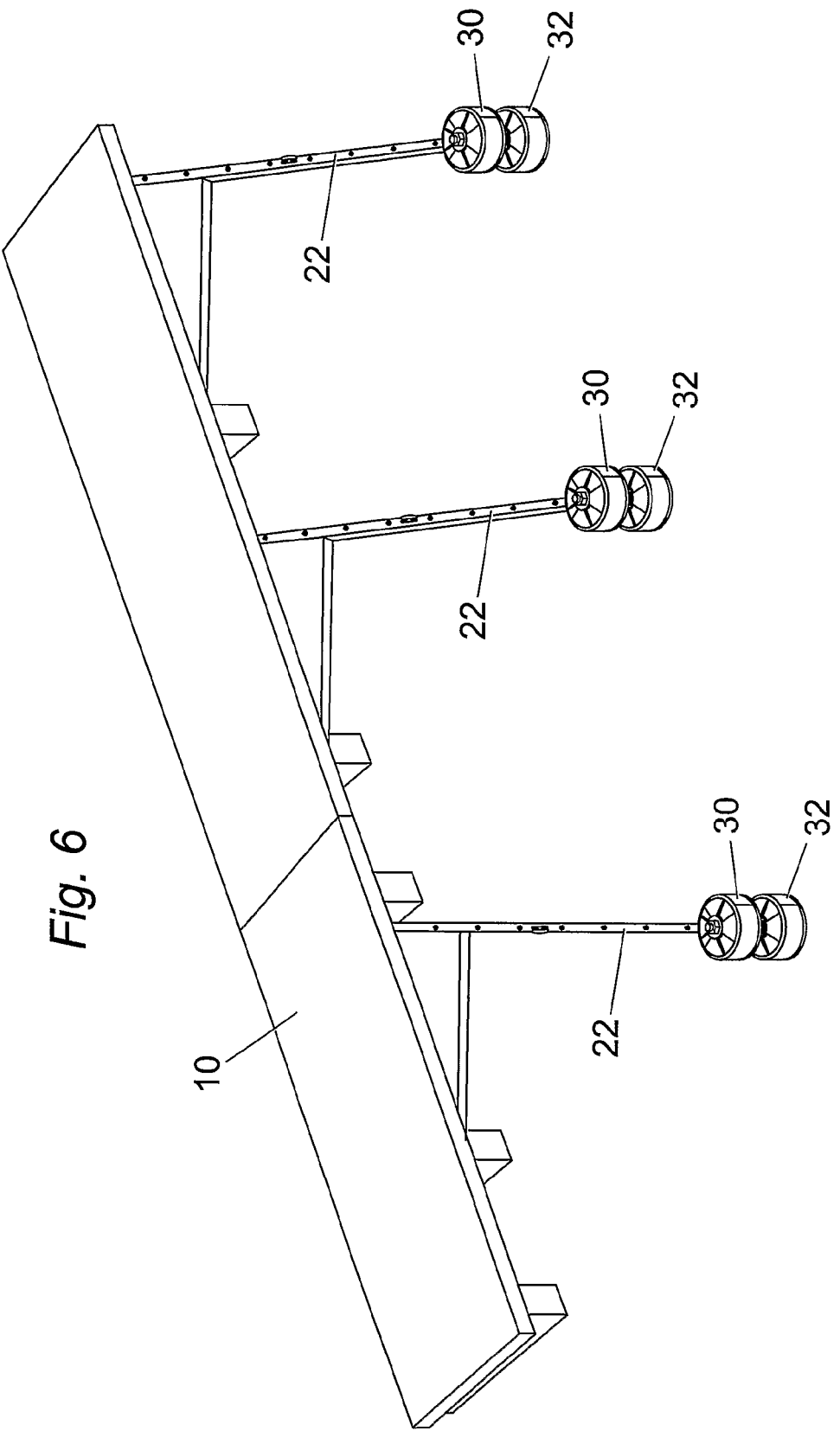
FIG. 6 shows an arrangement similar to FIG. 5 but with angled berths.

FIG. 6 shows an arrangement similar to FIG. 5 but with the structures 20 disposed at an angle to the pontoon 10, in this example at an angle of 30°. Many users will find it easier to enter and leave a berth angled in this manner, and it also allows the lane width between pontoons to be reduced. Other oblique angles are possible, for example the angle may be between 15° and 45°.

The foregoing embodiments are suitable for berthing vessels up to about 15 meters LOA. For larger craft the arrangement shown in FIG. 7 may be used. Here the structure 20 comprises a composite arm 22A formed by spaced beams 48 in a V-formation and joined by cross-braces 50. In addition to the outboard fenders 30 and 32, a further pair of rotatable cylindrical fenders 50, 52 is provided at an intermediate location to give additional buoyancy and also to provide further guidance to a vessel entering or leaving the berth.

Figure 7:
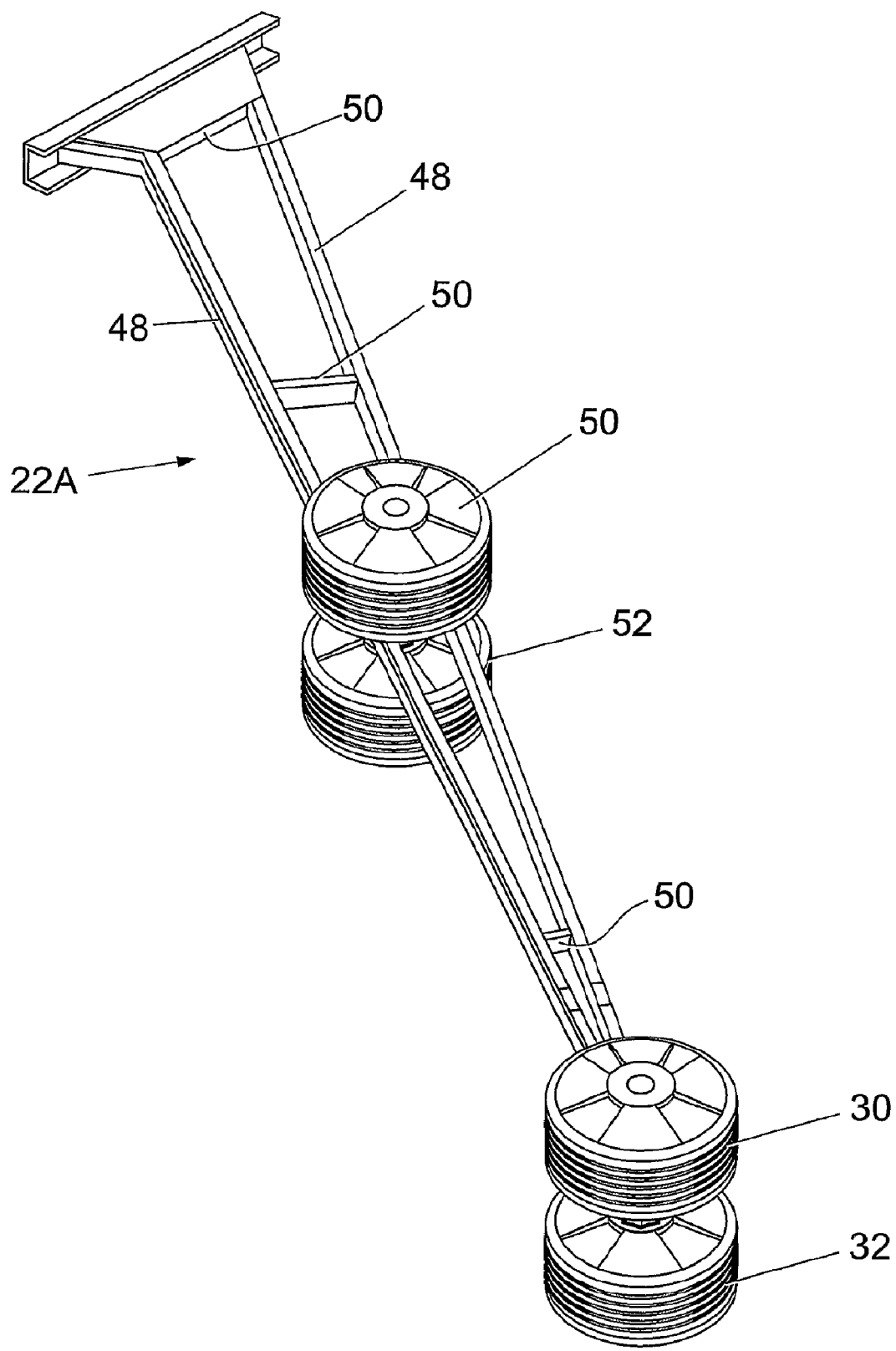
FIG. 7 is a perspective view of a separations and guidance structure suitable for larger vessels.

The composite arm 22A of FIG. 7 is at an inclined angle to the pontoon, but it will be apparent that a right-angle version is equally possible.

Two or more rotatable fenders per arm may be used on any size of arm to provide sufficient guidance and fendering to allow the vessel to dispense with on-board fenders hung over the vessel side.

Other modifications may be made to the foregoing embodiments within the scope of the claims. For example, it would be possible (although less desirable) to provide outboard fendering which is non-rotatable so long as it covers the outboard end of the arm. Also, the outboard fendering and the flotation of the arm could be divorced, there being no need for the flotation to be at the outboard end.

The invention may be applied to craft other than pleasure craft such as patrol boats, lifeboats, customs launches and pilot boats, typically up to 33 meters length.

As well as in fixed marinas, the invention may be used as part of a mobile marina system that may be utilised to temporarily expand or establish marina facilities to meet regatta, boat show, seasonal or other temporary requirements. The structures may be transported by road, rail or sea, with or without additional pontoon or dock units. If transported on a ship, the ship itself may provide the dockside facilities, pontoons may be attached to the ship, and the separation and guidance structures may be attached to the pontoons.

The invention thus provides a berthing system which gives improved safety, ease of berthing and unberthing, and in certain embodiments a greater density of berths in a given water area.

The invention claimed is:

1. A separation and guidance structure for use in a berthing system, the structure comprising a link arm, an attachment structure for connection to a pontoon at a first end of the link arm, a flotation device toward a second end of the link arm, and at least one first fender provided at the second end of the link arm, at least a portion of the first fender extending above the link arm and beyond the second end of the link arm so as to serve as a guide for a boat approaching the berthing system; wherein the link arm has sides extending between the first and second ends, and wherein the link arm is provided with resilient fender means on the sides thereof.

2. A structure according to claim 1, wherein the first fender is a rotating fender arranged for rotation about a substantially vertical axis.

3. A structure according to claim 1, wherein the link arm has a width and the rotating fender has a width greater than the width of the link arm.

4. A structure according to claim 1, wherein the flotation device is a second fender extending below the link arm.

5. A structure according to claim 4, wherein the second fender is a rotating fender arranged for rotation about a substantially vertical axis.

6. A structure according to claim 5, wherein the link arm is provided at its second end with a shaft extending substantially vertically, the first and second fenders being mounted on said shaft.

7. A structure according to claim 1, wherein the link arm is provided with guidance lights arranged along the link arm.

8. A structure according to claim 1, wherein the structure includes an identification light mounted above the first fender.

9. A structure according to claim 7, further including solar power means to power said lights.

10. A structure according to claim 1, wherein the attachment structure includes fasteners and dampers.

11. A structure according to claim 1, wherein the attachment structure includes a mounting bracket for connection to the pontoon and adapted to provide resistance to lateral forces applied to the link arm by a berthing boat.

12. A structure according to claim 11, wherein the mounting bracket includes a connection member extending transversely with respect to the link arm and at least one bracing member connecting the connection member and the link arm.

13. A structure according to claim 1, wherein the link arm includes at least one cleat arranged on an upper surface of the link arm.

14. A structure according to claim 1, wherein the link arm comprises two beams arranged in a V formation.

15. A structure according to claim 1, wherein the link arm has sides extending between the first and second ends, and wherein the link arm includes at least one further flotation device and at least one further fender provided at an intermediate position on the link arm, at least a portion of the further fender extending above the link arm and beyond the sides of the link arm so as to serve as a guide for a boat approaching the berthing system.

16. A berthing system comprising at least one of a pontoon and a dock, and a plurality of structures according to claim 1 extending from said at least one of said pontoon and said dock.

17. A berthing system according to claim 16, in which finger walkways extend from said at least one of said pontoon and said dock, and each of said plurality of structures is placed between two of said finger walkways.

18. A berthing system according to claim 16, in which said plurality of said structures extend from said at least one of said pontoon and said dock in a parallel formation without intervening finger walkways.

19. A berthing system according to claim 18, in which said plurality of said structures are at right angles to said at least one of said pontoon and said dock.

20. A berthing system according to claim 18, in which said plurality of said structures are at an oblique angle to said at least one of said pontoon and said dock.

* * * * *